United States Patent
Kim et al.

(10) Patent No.: US 12,078,757 B2
(45) Date of Patent: Sep. 3, 2024

(54) VISION FIRST LIGHT DETECTION AND RANGING SYSTEM

(71) Applicant: CRAZING LAB, INC., Sunnyvale, CA (US)

(72) Inventors: Sang-Pyo Kim, Los Altos, CA (US); SeongYoon Cho, Seoul (KR); Jae Young Lee, Gyeonggi-do (KR)

(73) Assignee: CRAZING LAB, INC., Sunnyvale, CA (US)

( * ) Notice: Subject to any disclaimer, the term of this patent is extended or adjusted under 35 U.S.C. 154(b) by 719 days.

(21) Appl. No.: 16/930,981

(22) Filed: Jul. 16, 2020

(65) Prior Publication Data

US 2022/0018940 A1    Jan. 20, 2022

(51) Int. Cl.
| | |
|---|---|
| *G01S 7/481* | (2006.01) |
| *G01S 17/50* | (2006.01) |
| *G01S 17/89* | (2020.01) |
| *G02B 26/10* | (2006.01) |

(52) U.S. Cl.
CPC ........... *G01S 7/4817* (2013.01); *G01S 7/4811* (2013.01); *G01S 17/50* (2013.01); *G01S 17/89* (2013.01); *G02B 26/105* (2013.01)

(58) Field of Classification Search
None
See application file for complete search history.

(56) References Cited

U.S. PATENT DOCUMENTS

| | | | |
|---|---|---|---|
| 9,164,173 B2* | 10/2015 | Bridges | G01C 15/002 |
| 11,468,285 B1* | 10/2022 | Tang | H04N 5/144 |
| 2012/0105821 A1* | 5/2012 | Moser | G01S 17/86 |
| | | | 356/3.09 |
| 2012/0236320 A1* | 9/2012 | Steffey | G01S 7/4811 |
| | | | 356/614 |
| 2013/0182239 A1 | 7/2013 | Kaiser | |
| 2014/0240691 A1* | 8/2014 | Mheen | G01S 17/89 |
| | | | 356/4.07 |
| 2015/0316650 A1 | 11/2015 | Imai | |
| 2018/0136314 A1 | 5/2018 | Taylor et al. | |
| 2018/0299534 A1 | 10/2018 | LaChapelle et al. | |

(Continued)

FOREIGN PATENT DOCUMENTS

| | | | | |
|---|---|---|---|---|
| JP | H10505155 A | * | 5/1995 | ......... G01N 21/8806 |
| TW | 201637440 A | | 10/2016 | |

(Continued)

OTHER PUBLICATIONS

Machine Translation of JP H10505515 A (Year: 1995).*

(Continued)

*Primary Examiner* — Luke D Ratcliffe
(74) *Attorney, Agent, or Firm* — WTA Patents

(57) ABSTRACT

A vision first light detection and ranging (LIDAR) system captures an image including a targeted object and uses the image to determine a predicted location of the targeted object. Based on the predicted location, the vision first LIDAR system directs a tracking beam onto the targeted object and detects a portion of the tracking beam reflected by the targeted object. The vision first LIDAR system includes an image sensor to capture the image for predicting the location of the targeted object and includes a distance sensor to determine a distance to the targeted object using the tracking beam.

23 Claims, 10 Drawing Sheets

(56) References Cited

U.S. PATENT DOCUMENTS

2019/0132572 A1     5/2019   Shen et al.
2019/0353786 A1    11/2019   Wei
2021/0293931 A1*    9/2021   Nemet .................. G01S 7/4813

FOREIGN PATENT DOCUMENTS

TW            201835603 A    10/2018
TW            201920983 A     6/2019
WO    WO 2020/075525 A1     4/2020

OTHER PUBLICATIONS

Carter, Jamie et al., "Lidar 101: An Introduction to Lidar Technology, Data, and Applications", Nov. 2012, NOAA Coastal Services Center (Year: 2012).*
"How does a laser speed gun work to measure a car's speed?", Jun. 7, 2000, HowStuffWorks.com (Year: 2000).*
Citation information for HowStuffWorks.com article (Used solely to establish publishing date) (Year: 2000).*
Iida, K et al., "Saccade Mirror 3: High-speed gaze controller with ultra wide gaze control range using triple rotational mirrors," 2016 IEEE International Conference on Robotics and Automation (ICRA), May 2016, pp. 624-629.
PCT International Search Report and Written Opinion, PCT Application No. PCT/US2021/034911, Sep. 30, 2021, ten pages.

* cited by examiner

VISION FIRST LIGHT DETECTION AND RANGING SYSTEM

BACKGROUND

The present disclosure relates to a vision first light detection and ranging (LIDAR) system for tracking a targeted object and determining a distance to the targeted object.

In a conventional method for measuring distance to a targeted object, a depth map is generated using LIDAR systems and time of flight (ToF) systems. These systems use a raster scan or illuminate a full field of view to generate an entire depth map of an area and determine the distance to the targeted object from the depth map. The conventional method requires trade-offs in speed, resolution, power consumption, and computation.

SUMMARY

Embodiments relate to a vision first light detection and ranging (LIDAR) system that tracks a targeted object as it moves along its trajectory using captured images of the targeted object and determines a distance to the targeted object using a tracking beam. The vision first LIDAR system may be used to capture focused and centered images of the targeted object using a tracking beam that can track the targeted object despite its movements. The vision first LIDAR system includes an image sensor to detect and track the targeted object, and a distance sensor including a tracking beam emitter and a photo detector to measure the distance to the targeted object relative to the tracking system.

In the vision first LIDAR system, the image sensor captures an image of the targeted object and identifies pixel locations of the targeted object from the image. After the targeted object is identified in the image, a beam scanner moves along to track predicted locations of the targeted object determined based on the pixel locations of the targeted object in the image. The tracking beam of the distance sensor is directed at the predicted locations by the beam scanner such that the distance sensor may continuously determine the distance to the targeted object even if the targeted object is moving. In one or more embodiments, the beam scanner of the vision first LIDAR system is a 2D galvanometer mirror or a 2D microelectromechanical system (MEMS) mirror. The distance to the targeted object is determined by the distance sensor by detecting a portion of the tracking beam after the tracking beam is reflected from the targeted object.

In one or more embodiments, the vision first LIDAR system includes an optics assembly that lies in a path of light between the image sensor and the targeted object. The optics assembly may be used to adjust a field of view of the image sensor to capture the targeted object. The optical assembly may direct the tracking beam to the targeted object and direct the portion of the tracking beam reflected from the targeted object to the distance sensor.

In one or more embodiments, the vision first LIDAR system includes a first beam splitter and a second beam splitter. After the portion of the tracking beam is reflected from the moving object, the tracking beam is transmitted through the first beam splitter and reflected by the second beam splitter to the distance sensor.

In one or more embodiments, the distance sensor of the vision first LIDAR system emits another tracking beam for tracking another targeted object. The distance sensor detects the distance to the other targeted object based on an elapsed time between a time at which the tracking beam is emitted and a time at which the portion of the tracking beam is detected.

BRIEF DESCRIPTION OF DRAWINGS

Figure (FIG.) 1A is a schematic diagram of a vision first light detection and ranging (LIDAR) system including a camera, in accordance with one embodiment.

Figure 1A:
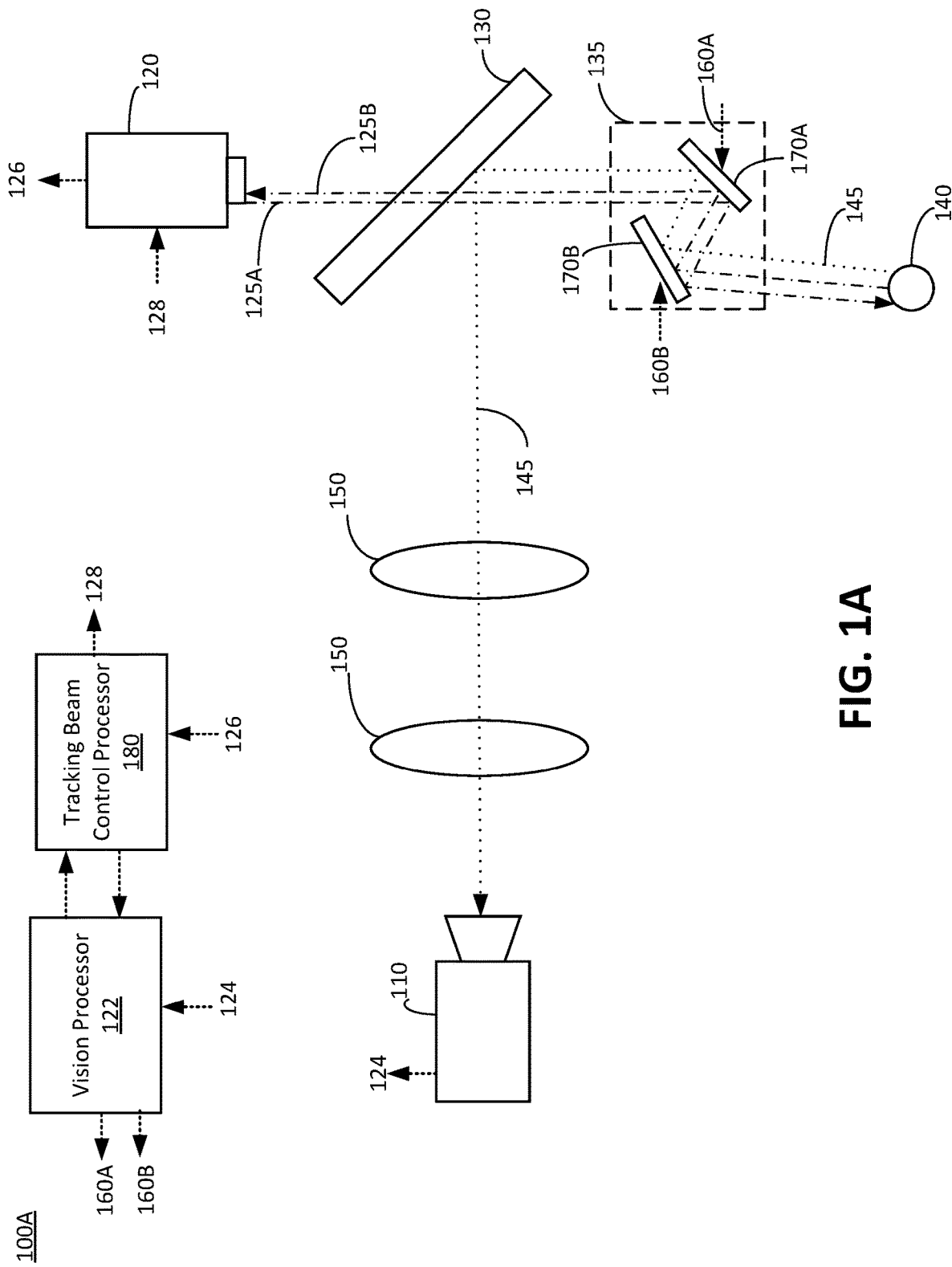
FIG. 1B is a schematic diagram of a vision assisted tracking first LIDAR system including a camera, in accordance with one embodiment.
FIG. 1C is a schematic diagram of a vision assisted tracking first LIDAR system including two cameras, in accordance with one embodiment.

The figures depict embodiments of the present disclosure for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to a vision first light detection and ranging (LIDAR) system that tracks a targeted object by capturing an image of a real-life environment including the targeted object, identifying a location of the targeted object in the image and predicting the location of the targeted object to direct a tracking beam onto the targeted object for determining a distance to the targeted object. Pixels of the targeted object is identified in an image captured by an image sensor. The targeted object is tracked by predicting the movement of the targeted object based on the captured image and operating a beam scanner according to the prediction. One or more tracking beams are projected onto the targeted object through the beam scanner and reflected portions of the tracking beams are received by a distance sensor that determines the distance to the targeted object.

Figure (FIG.) 1A is a schematic diagram of a vision first LIDAR system 100A including a camera, in accordance with one embodiment. The vision first LIDAR system 100A tracks a targeted object 140 by analyzing captured images of the targeted object 140 and determines the distance to the targeted object 140 using one or more tracking beams 125A. For this purpose, the vision first LIDAR system 100A may include, among other components, a camera 110 (also referred to herein as "an image sensor 110"), a range finder 120 (also referred to herein as "distance sensor 120"), a beam splitter with polarization 130, a beam scanner 135, a vision processor 122, an optics assembly 150, and a tracking beam control processor 180.

In some embodiments, the camera 110 has a global shutter. Global shutters expose all pixels of the imaging sensors (e.g., CMOS sensors) simultaneously in a given frame in comparison to rolling shutters that build a frame by exposing a row of pixels at a time. Global shutters may provide more accurate results for tracking fast targeted objects compared to rolling shutters. In other embodiments, the camera 110 has rolling shutters. Rolling shutters may allow the camera 110 to capture 200 frames or more per second which is greater than 60 frames or more per second of global shutters to reduce blurred effect in moving objects.

The vision processor 122 may receive image data 124 corresponding to images captured by the camera 110, perform image processing algorithm to detect the targeted object 140 in the captured images, and localize the targeted object 140 using a localization algorithm. Depending on the environment and the type of object, the vision processor 122 may use, for example, one or more of edge detection, deep learning, Hough transform, Kalman filter, spatial filter, temporal filter, and other vision recognition methods to detect and localize the targeted object 140 in the captured images.

In some embodiments, when the vision processor 122 is unable to identify the targeted object 140 from the image data 124 from the camera 110, the beam scanner 135 may perform in raster scanning mode until the targeted object 140 is detected. During the raster scanning mode, the beam scanner 135 causes the field of view of the camera 110 to sweep side to side from top to bottom to capture images of different areas of the environment until the targeted object 140 is detected in one of the images. The image data 124 of images captured during the raster scanning mode is sent to the vision processor 122 for object identification. When the image data 124 includes the targeted object 140, the vision processor 122 identifies the targeted object 140 in the image data 124 and determines pixel locations corresponding to the targeted object 140. After detecting and localizing the targeted object 140 in the image data 124 from the camera 110, the vision processor 122 predicts a location of the targeted object 140 based on the pixel locations and sends control signals 160A, 160B (collectively referred to as "control signals 160" herein) to the beam scanner 135. The beam scanner 135 is configured to perform in tracking scanning mode and follow the movement of the targeted object 140, so that the targeted object 140 is centered in the images captured by the camera 110 and the tracking beam 125 is directed onto the targeted object 140. During the tracking scanning mode, the camera 110 continues to capture images of the targeted object 140 and the tracking beam 125 continues to be directed onto the targeted object 140 as it moves.

The range finder 120 determines a distance to the targeted object 140 using one or more tracking beams 125A (e.g., a laser beam). The range finder 120 includes a beam emitter that emits the tracking beam 125A and a photo detector that detects a reflected tracking beam 125B after being reflected off a surface of the targeted object 140. In some embodiments, the beam emitter may be a laser diode or a vertical cavity surface emitting laser (VCSEL). In some embodiments, the photo detector may be a photo diode or a single photon avalanche diode (SPAD). The range finder 120 receives control signals 128 for emitting the tracking beam 125 from the tracking beam control processor 180. The distance between the range finder 120 and the targeted object 140 may be determined, for example, by measuring elapsed time between a time at which the tracking beam 125A is emitted by the range finder and a time at which the reflected tracking beam 125B is detected by the range finder 120 after being reflected off the targeted object 140, using a conventional method that is well known in the art. In the embodiment of FIG. 1A, the tracking beam 125A and the reflected beam 125B pass through the beam splitter with polarization 130 to and from the targeted object 140. After determining the distance to the targeted object 140, the range finder 120 may generate a distance signal 126 and provide the distance signal 126 to the tracking beam control processor 180.

The beam splitter with polarization 130 is an optical component that combines or splits light 145, the tracking beam 125A, and the reflected tracking beam 125B. The beam splitter with polarization 130 is placed within the system 100A such that the beam splitter with polarization 130 is in a path of light between the targeted object 140 and the range finder 120 which partially overlaps with the path of light between the targeted object 140 and the camera 110. The beam splitter with polarization 130 may have one or more filters to transmit the tracking beam 125A, 125B but reflect light 145 in the visible spectrum towards the camera 110. By having the paths of light overlap, the tracking beams 125A may more accurately be projected onto the targeted object 140.

The tracking beam 125A passing through the beam splitter with polarization 130 is directed onto the targeted object 140 by the beam scanner 135. The beam scanner 135 includes one or more mirrors 170A, 170B that change orientations based on the control signals 160. The control signals 160 may represent variations in voltage supplied to an actuator in the beam scanner 135. The one or more mirrors may include a first mirror 170A that has a rotational axis along a horizontal axis and a second mirror 170B that has a rotational axis along a vertical axis. The combination of the first mirror 170A and the second mirror 170B gives the beam scanner 135 two degrees-of-freedom to direct the tracking beam 125A in any direction.

The beam scanner 135 can track the movement of the targeted object 140 precisely because it has fine angular resolution and fast response time. In one example, a mirror (e.g., mirrors 170A, 170B) in the beam scanner 135 has an angular resolution of 0.025 degrees and a step response time of 100 μs. As the targeted object 140 moves, the mirrors 170A, 170B in the beam scanner 135 can also move to continue directing the tracking beam 125A from the range finder 120 to the targeted object 140 and back to the range finder 120. As a result, the range finder 120 can detect the distance to the targeted object 140 with high precision and accuracy.

As the targeted object 140 moves, the camera 110 continues to capture images of the targeted object 140 to localize and predict the further locations of the targeted object 140 based on pixels of the targeted object 140 in the image data 124. Specifically, the image data 124 generated by the camera 110 includes pixels representing the targeted object 140. Such pixels can be mapped to a two-dimensional location of the targeted object 140 in the environment by the vision processor 122 to generate control signals 160 to the beam scanner 135 for directing the tracking beam 125A onto the targeted object 140. Based on the predicted locations of the targeted object 140, the vision processor 122 generates updated control signal 160 for adjusting the orientation of the beam scanner 135 to direct the tracking beam 125A onto the targeted object 140 at an updated location.

The tracking beam 125A is reflected off a surface of the targeted object 140 and directed by the beam scanner 135 back to the range finder 120 for determining distance. For images, light (e.g., ambient light) reflected off the targeted object 140 is directed to enter through the lenses of the camera 110. In addition to guiding the tracking beam 125A from the range finder 120 to the targeted object 140, the beam scanner 135 also guides light 145 reflected from the targeted object 140 to the camera 110 for capturing images of the targeted object 140 and the reflected tracking beam 125B to the range finder 120. Because the reflected tracking beam 125B and light 145 are both directed by the beam scanner 135 to the range finder 120 and the camera 110, the tracking beam 125B and light 145 are synchronized such that the distance determined by the range finder 120 based on the tracking beam at a given time accurately corresponds to a frame of image captured by the camera 110 based on light 145. Light 145 is reflected from the beam scanner 135 and the beam splitter with polarization 130 and passed through the optical assembly 150 before entering through the lens of the camera 110.

By using the beam scanner 135, the camera 110 can capture detailed images of the targeted object 140 accurately without having to move the entire camera 110 as the targeted object 140 moves. That is, the camera 110 remains in a fixed position while the targeted object 140 moves, and the beam scanner 135 is actuated according to the movement of the targeted object 140 based on control signals 160 generated by processing the image data 124 to direct the reflected light 145 from the targeted object 140 into the lens of the camera 110.

Light 145 is passed through the optical assembly 150 before entering the lens of the camera 110. The optical assembly 150 includes one or more lenses, and the optical assembly 150 centers light 145 reflected from the targeted object 140 into the lens of the camera 110. The optical assembly 150 may include one or more pupil shift lenses. Once the image data 124 (including the pixels representing the targeted object 140) is generated by the camera 110, the image data 124 is sent to the vision processor 122 for image processing (e.g., sharpening, noise reduction, and color correction) and motion estimation to predict the movement of the targeted object 140.

Figure 1B:
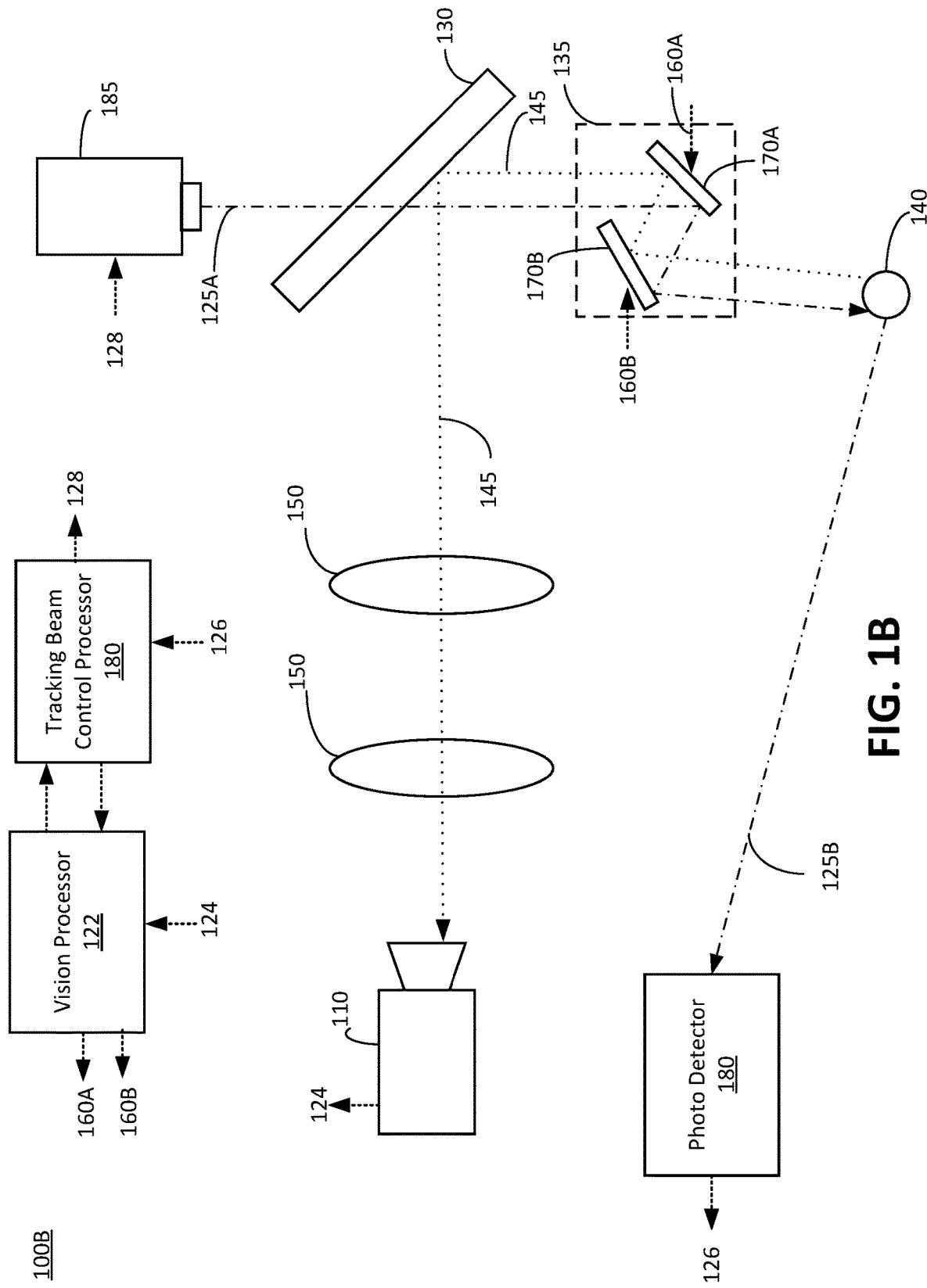

FIG. 1B is a schematic diagram of a vision first LIDAR system 100B including a camera, in accordance with one embodiment. The vision first LIDAR system 100B is a variation of the vision first LIDAR system 100A of FIG. 1A. In the vision first LIDAR system 100B, the range finder 120 may be replaced with a beam emitter 185 and a photo detector 180. The beam emitter 185 emits the tracking beam 125A and the photo detector 180 detects the reflected tracking beam 125B after it is reflected off the targeted object 140. Among other benefits, the vision first LIDAR system 100B may be more compact compared to the vision first LIDAR system 100A because the combined dimensions of the beam emitter 185 and the detector 180 are smaller than the dimensions of the range finder 120.

Figure 1C:
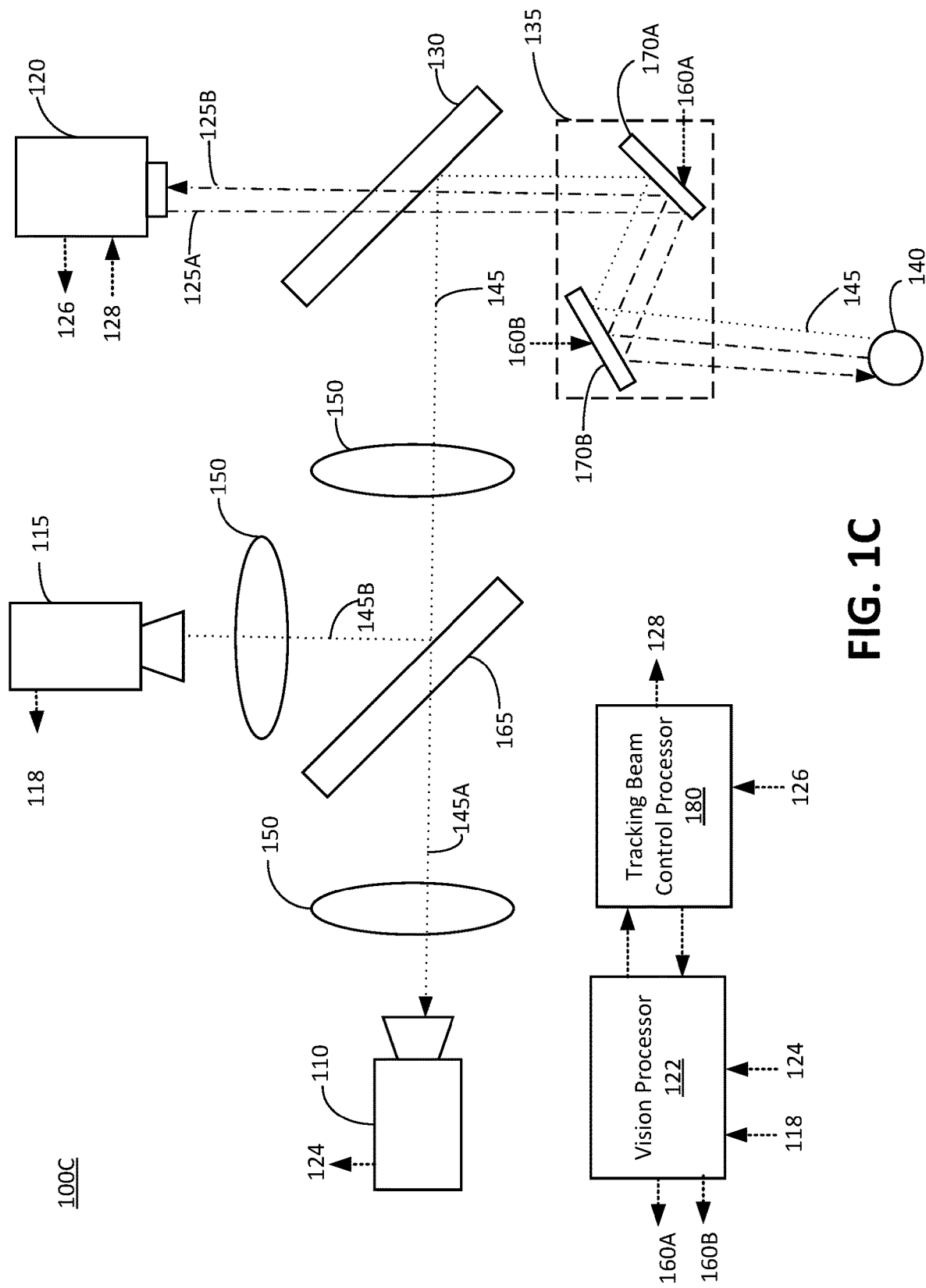

FIG. 1C is a schematic diagram of a vision first LIDAR system 100D including two cameras, in accordance with one embodiment. The vision first LIDAR system 100B includes a first camera 110 (also referred to herein as "first image sensor 110"), a second camera 115 (also referred to herein as "second image sensor 115"), a range finder 120, a beam combiner 130, a beam scanner, an optics assembly 150, a vision processor 122, a beam splitter 165, and a tracking beam control processor 180. In some embodiments, the range finder 120 may be replaced with a beam emitter and a photo detector. Description for elements discussed above with respect to FIG. 1A is omitted to avoid redundancy.

In contrast, in the vision first LIDAR system 100C of FIG. 1C, the beam scanner 135 is positioned such that light 145 reflected off the targeted object 140 is directed toward both the first camera 110 and the second camera 115. The embodiment of FIG. 1C is advantageous, among other reasons, because the FOVs of the first camera 110 and the second camera 115 can be aligned simultaneously by operating the beam scanner 135.

The beam scanner 135 directs light 145 from the targeted object 140 to the beam splitter with polarization 130. Light 145 is then reflected by the beam splitter with polarization 130 that transmits a tracking beam 125A emitted by the range finder 120 but reflect light in the visible spectrum (e.g., light 145) toward the first camera 110 and the second camera 115. Light 145 passes through the optical assembly 150 that lies between the beam combiner 130 and the first camera 110 and the second camera 115. The lenses in the optical assembly 150 and other configurations may be selected and arranged to provide the desired FOVs to the first camera 110 and the second camera 115.

The beam splitter 165 splits light 145 into first portion of light 145A and second portion of light 145B for capturing by the first camera 110 and the second camera 115, respectively. As illustrated in FIG. 1C, the first camera 110 and the second camera 115 may be oriented in different directions. The first portion 145A is directed toward the first camera 110 and the second portion 145B is directed toward the second camera 115. The first camera 110 may be used to capture a narrower field of view for more detailed images of the targeted object 140 while the second camera 115 is used to capture a wide field of view for detecting the targeted object 140. Image data 224 captured by the first camera 110 and image data 118 captured by the second camera 115 are sent to the vision processor 122 for image processing.

In some embodiments, a vision first LIDAR system may include additional range finders (not shown). For example, there may be a first range finder for short range (e.g., under 100 yards), a second range finder for mid-range (e.g., between 100 yards and 1,000 yards), and a third range finder for long range (e.g., beyond 1,000 yards). With multiple range finders, the vision first LIDAR system (e.g., vision first LIDAR system 100A or 100B) may track more than one object at a time. For example, in a baseball game, the different range finders can be used to track the movement of the baseball, each player on the field, a pitcher's arm, and other targeted objects simultaneously using the same vision first LIDAR system. Because the beam scanner may scan a wide range of angles within a short period of time, the multiple range finders can emit tracking beams and a single beam scanner can be used to direct the tracking beams from the multiple range finders to the different objects for determining positions of the different objects. The vision first LIDAR system may also include additional cameras to captures images of the different objects at once. In other embodiments, the same range finder may emit an array of tracking beams projected onto different objects to obtain distances to different objects. The range finder in such embodiments include a tracking beam source that transmits tracking beams in different emission directions or include a separate the beam scanner within the range finder so that the same tracking beams are transmitted to different targets at different times.

In other embodiments, the range finder 120 may send a tracking beam to multiple spots in a targeted area to determine the distance to multiple objects in the targeted area using the same tracking beam. For this purpose, the beam scanner 135 or a separate mechanism may be used to direct the tracking beam to the multiple spots. Such spreading of the tracking beam to multiple spots may occur during a frame time of the cameras (e.g., 110 and 115) so that the cameras can track a primary target while sensing distances to the multiple spots at or around the primary target (e.g., within the viewing area of one or more cameras).

Among other benefits, the vision first LIDAR systems described in FIGS. 1A-1C have the advantages of (i) using fewer components compared to conventional systems for capturing images of high speed objects (e.g., the same beam scanner has multiple purposes of tracking a targeted object as well as directing light from a scene towards the camera for capturing images of the targeted objects), (ii) enables a fine targeting resolution of the tracking beam and fast response time for detecting the distance because the tracking beam can be directed to the targeted object promptly and accurately by the beam scanner, and (iii) avoids complications and costs associated using a high performance lens assembly in the cameras because the beam scanner operates to provide the desired FOV to the cameras.

Figure 2A:
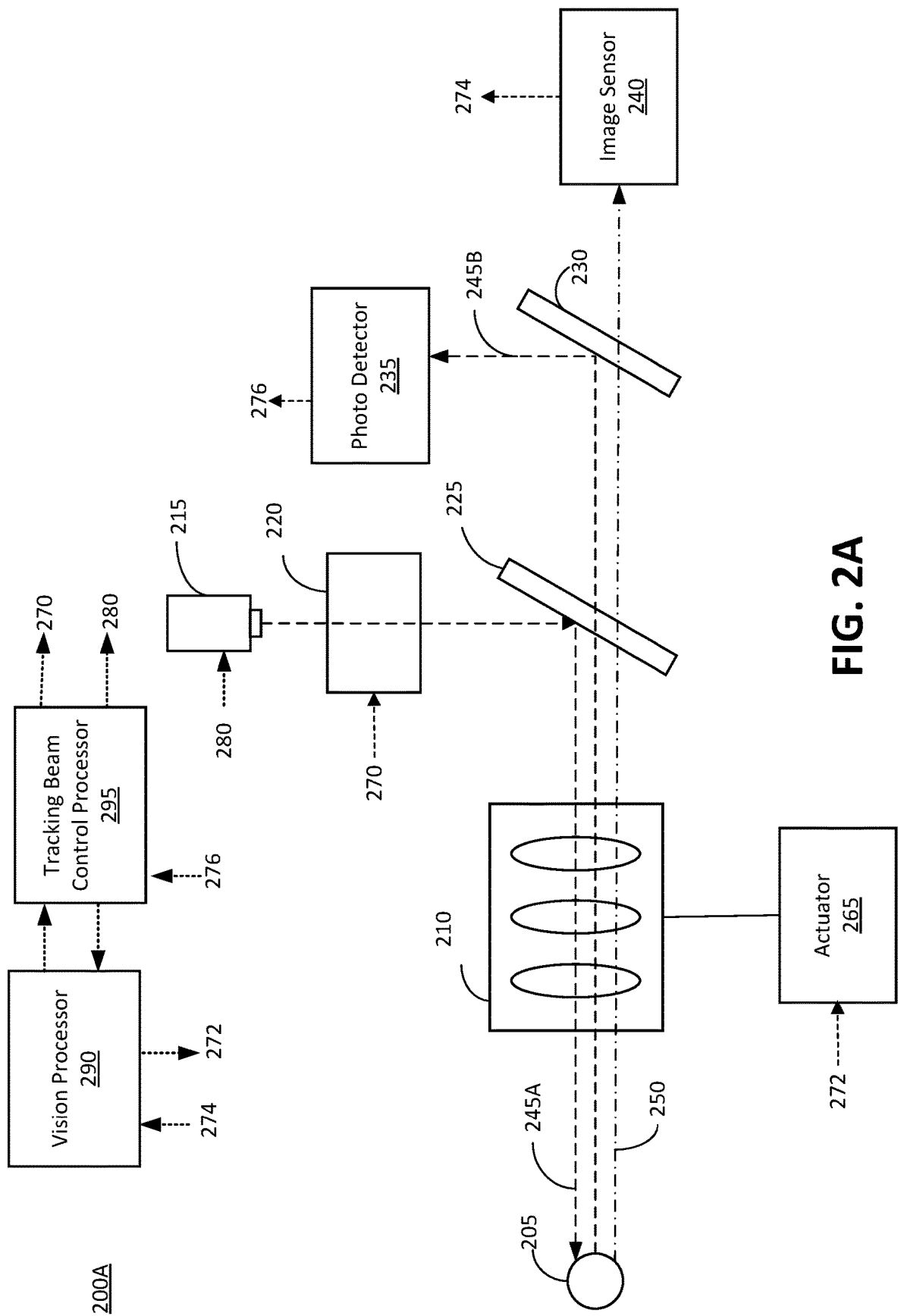
FIG. 2A is a schematic diagram of a vision first LIDAR system including an image sensor, in accordance with one embodiment.

FIG. 2A is a schematic diagram of a vision first LIDAR system 200A including an image sensor, in accordance with one embodiment. The vision first LIDAR system 200A may include, among other components, an optics assembly 210, a beam emitter 215, a beam scanner 220, a first beam splitter with polarization 225, a second beam splitter 230, a photo detector 235, an image sensor 240, an actuator 265, a vision processor 290, and a tracking beam control processor 295. Compared to embodiments of FIGS. 1A-1C, the vision first LIDAR system 200A may use the same optics assembly 210 and reduce or eliminate redundant components associated with using the range finder or cameras. Instead, the same optics assembly 210 may be used to adjust the focal distance to the image sensor 240 as well as control and capture tracking beam emitted from the beam emitter 215. Description for elements discussed above with respect to FIGS. 1A-1C is omitted to avoid redundancy.

The image sensor 240 is a hardware component that receives light 250 representing the targeted object 205 through the optics assembly 210, the first beam splitter with polarization 225 and the second beam splitter 230. The image sensor 240 generates image data 274 representing a scene in its FOV. The image data 274 generated by the image sensor 240 is provided to the vision processor 290. The vision processor 290 may perform image processing algorithm to detect the targeted object 205 in the captured images and localize the targeted object 205 using a localization algorithm. After identifying and localizing the targeted object 205 from the image data 274, the vision processor 290 may communicate with the tracking beam control processor 295 that generates and provides a beam scanner control signal 270 to the beam scanner 220 and a control signal 280 to the beam emitter 215. The vision processor 290 may also generate an actuator control signal 272 to the actuator 265 to operate the optics assembly 210.

The optics assembly 210 is a combination of optical elements that enable adjusting the FOV of the image sensor 240 and directing one or more tracking beams 245A onto targeted object 204. For this purpose, the optics assembly 210 includes one or more optical elements such as lenses, filters, mirrors and polarizers to change, for example, the focal points and characteristics of the light passing through the optics assembly 210. At least some of these optical elements are adjusted by the actuator 265 that receives actuator control signal 272 from the vision processor 290. By the operation of the actuator 265, the FOV of the image sensor 240 is adjusted to capture an image of a different area within the environment. The actuator 265 may be a motor that can adjust the focal distance of the image sensor 240 and direct the optics assembly 210 to make rotational movements to receive the light 250 from different parts of the environment. The vision processor 290 may generate the actuator control signal 272 to control such operations of the actuator 265. In other embodiments, the optics assembly 210 may be a static component, and the vision first LIDAR system 200 may not include the actuator 265.

After light 250 passes through the optics assembly 210, light 250 passes through the first beam splitter with polarization 225 and the second beam splitter 230. The first beam splitter with polarization 225 and the second beam splitter 230 transmits a portion of incident light to the image sensor 240 while reflecting another portion of the incident light onto the photo detector 235.

When light 250 reaches the image sensor 240, the image sensor 240 captures an image of the targeted object 205 and generates the image data 274 to be provided to the vision processor 290. The vision processor 290 receives the image data 274 and identifies the targeted object 140 in the image to localize the targeted object 205 in the captured images and predict future locations of the targeted object 205 based on pixels of the targeted object 205 in the image data 274 to generate the scanner control signal 270 and the actuator control signal 272. Using the scanner control signal 270 and the actuator control signal 272, the vision processor 290 directs one or more tracking beam 245A onto the targeted object 205. That is, the vision processor 290 analyzes pixel locations from the image data 274 to determine a two-dimensional location of the targeted object 205, and then determines a distance to the targeted object 205 using the tracking beam 245A.

The beam emitter 215 and the photo detector 235, as a combination, corresponds to a distance sensor that determines distances to one or more objects. The beam emitter 215 emits one or more tracking beams 245A (e.g., a laser beam) that are directed onto the targeted object 205 by the beam scanner 220 and the optics assembly 210. In one embodiment, the beam emitter 215 emits a single tracking beam 245A that is projected as a single light point onto the targeted object 205 by controlling the beam scanner 220. The beam scanner 220 may include one or more mirrors to direct the tracking beam 245A based on the scanner control signal 270 from the vision processor 290 corresponding to the pixel locations of the targeted object 140 identified from the image data 274. In another embodiment, the single tracking beam 245A may be projected as multiple light points or point cloud onto the targeted object 205 by controlling the beam scanner 220 to direct the tracking beam 245A to different locations on the targeted object 205 or different objects within the FOV of the image sensor 240. Such projection of the multiple light points or point cloud may occur during a single frame capture time of the image sensor 240. In yet another embodiment, the beam emitter 215 may include a plurality of beam sources that emit a plurality of tracking beams 245A via different light paths onto one or more objects in the FOV of the image sensor 240, for example, in a grid pattern. If the grid of tracking beams is of a sufficient resolution, the beam scanner 220 may be omitted. The beam emitter 215 may be embodied, for example, as a vertical cavity surface emitting laser (VCSEL) that simultaneously emits multiple tracking beams.

After the beam scanner 220 is actuated to direct the tracking beam 245A in a direction corresponding to the predicted location of the targeted object 205, the tracking beam 245A is directed to the first beam splitter 225. The first beam splitter 225 reflects the tracking beam 245A towards the optical assembly 210, and the tracking beam 245A passes through the optics assembly 210 before getting reflected by the targeted object 205. In some embodiments, the vision processor 290 may provide the actuator control signal 272 to the actuator 265 to cause the optics assembly 210 to position the tracking beam 245A accurately onto the targeted object 205.

The portion of tracking beam 245A reflected by the targeted object 205 passes through the optics assembly 210 as the reflected tracking beam 245B and is sent to the first beam splitter 225 and the second beam splitter 230 onto the photo detector 235. The photo detector 235 detects the reflected tracking beam 245B and generates detection signal 276 indicating the time at which the reflected tracking beam 245B was detected. By determining the time that one or more tracking beam 245A were emitted by the beam emitter 215 and the time that the tracking reflected beams 245B was detected at the photo detector 235, the distance between the photo detector 235 and the targeted object 205 can be determined. The detection signal 276 is sent to the tracking beam control processor 295 to determine the distance to the targeted object.

Figure 2B:
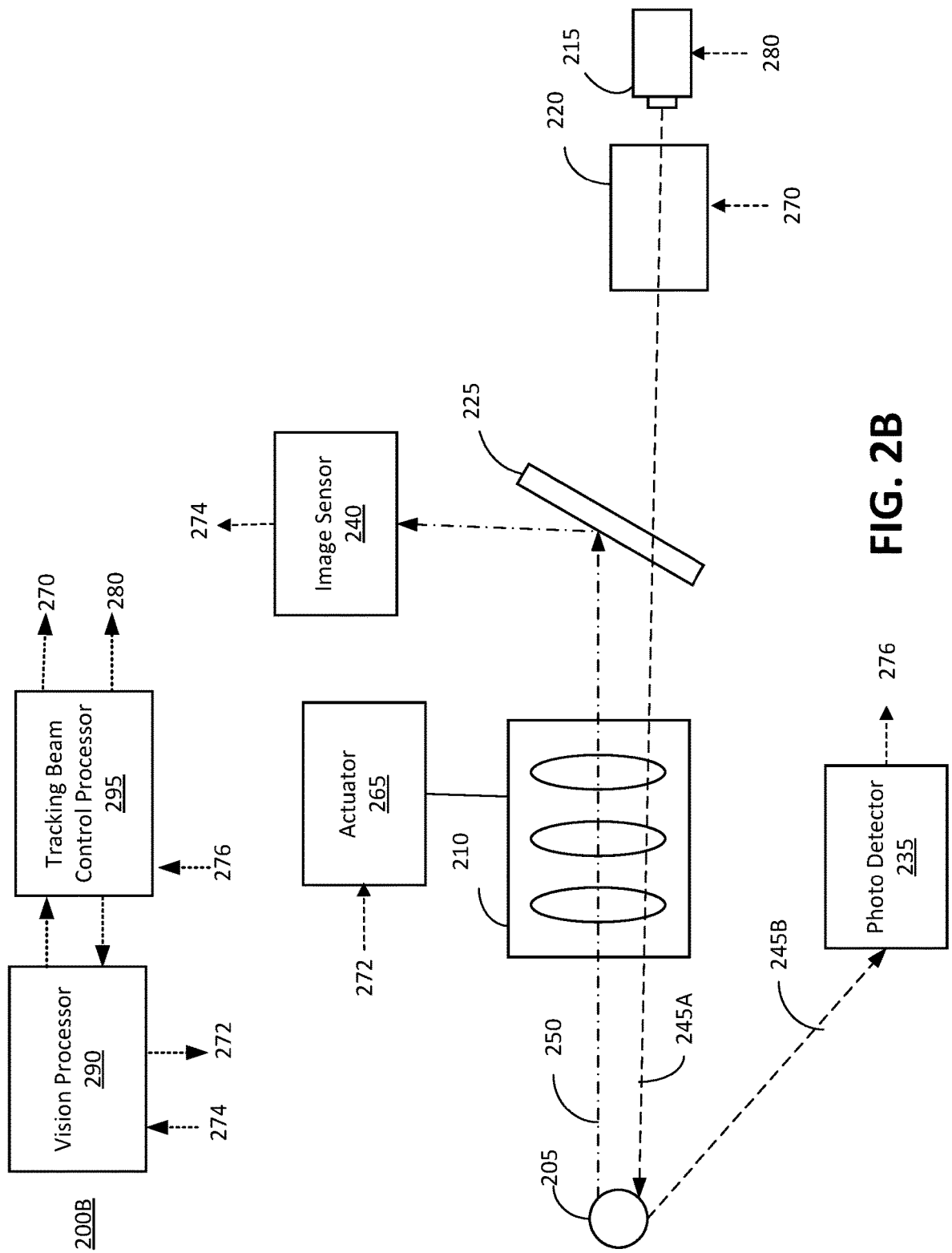
FIG. 2B is a schematic diagram of a vision first LIDAR system including an image sensor, in accordance with one embodiment.

FIG. 2B is a schematic diagram of a vision first LIDAR system 200B including an image sensor, in accordance with one embodiment. The vision first LIDAR system 200B includes an optics assembly 210, a beam emitter 215, a beam scanner 220, a first beam splitter 225, a photo detector 235, an image sensor 240, an actuator 265, a vision processor 290, and a tracking beam control processor 295. In the vision first LIDAR system 200B, there is only one beam splitter (e.g., the first beam splitter 225), compared to the vision first LIDAR system 200A that includes both the first beam splitter 225 and the second beam splitter 230. In FIG. 2A, the reflected tracking beam 245B passes through the optics assembly 210, the first beam splitter 225, and the second beam splitter 230 before being captured by the photo detector 235, but in FIG. 2B, the photo detector 235 directly captures the reflected tracking beam 245B in the vision first LIDAR system 200B. Additionally, in FIG. 2B, the image sensor 240 is disposed such that the image sensor 240 receives light 250 representing the targeted object 205 through the optics assembly 210 and the first beam splitter 225.

Figure 2C:
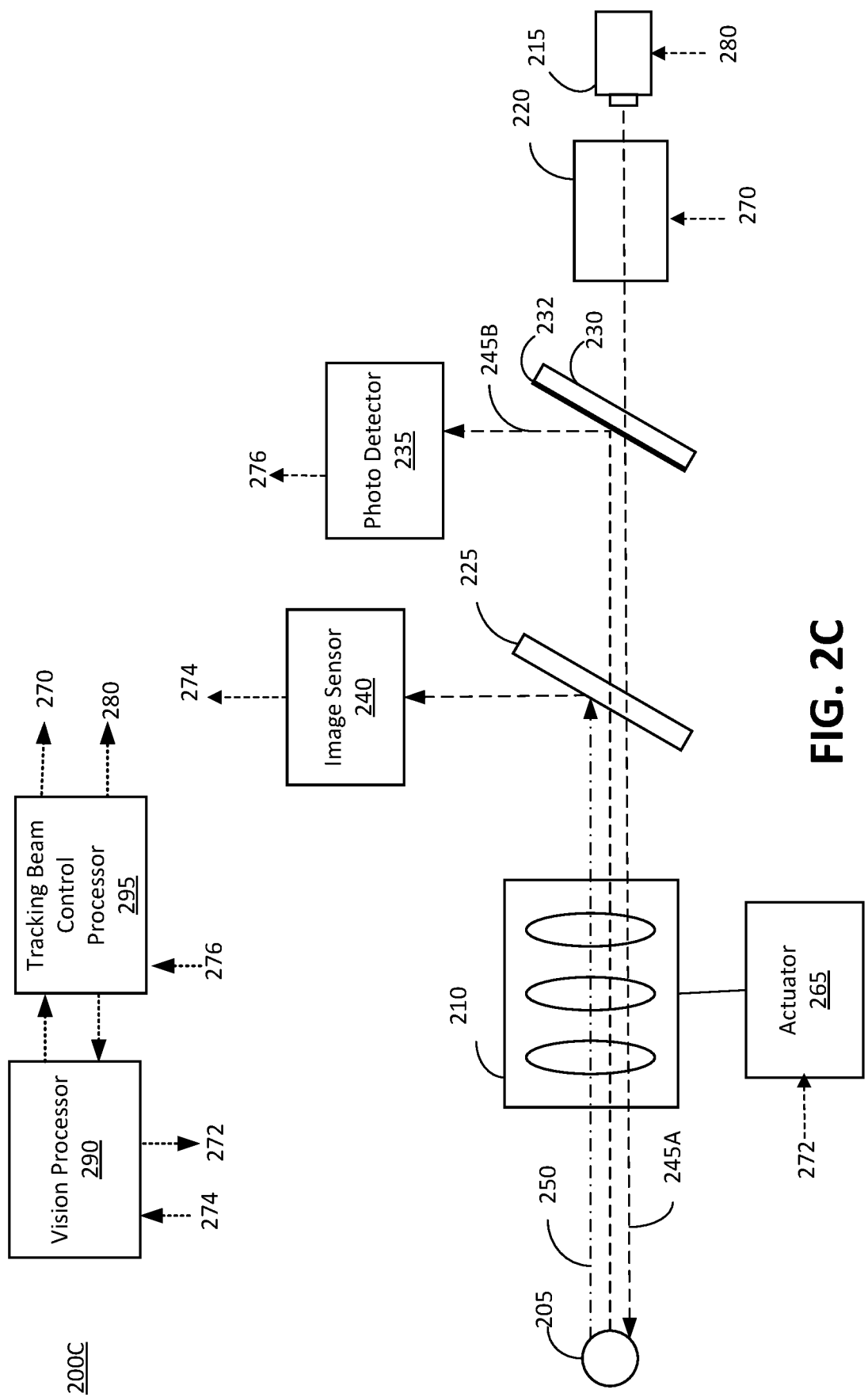
FIG. 2C is a schematic diagram of a vision first LIDAR system including an image sensor, in accordance with one embodiment.

FIG. 2C is a schematic diagram of a vision first LIDAR system 200C including an image sensor, in accordance with one embodiment. The vision first LIDAR system 200C is a variation of the vision first LIDAR system 200B of FIG. 2B, and the vision first LIDAR system 200C further comprises a second beam splitter 230 with a polarizing film 232.

The second beam splitter 230 is disposed in a path of light between the first beam splitter 225 and the photo detector 235 and between the path of light between the first beam splitter 225 and the beam emitter 215. The polarizing film 232 is on a surface of the second beam splitter 230 that the reflected tracking beam 245B is incident on and filters the reflected tracking beam 245B to prevent it from entering the beam emitter 215. Among other benefits, the polarization film 232 enables more precise detection of the reflected tracking beam 245B at the photo detector 235.

Figure 3B:
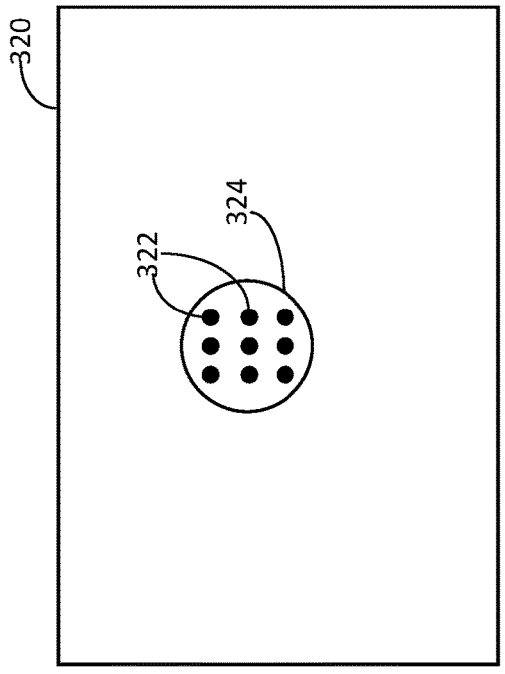
FIG. 3B is an example image capturing a targeted object exposed to tracking beams at multiple locations, in accordance with one embodiment.
Figure 3A:
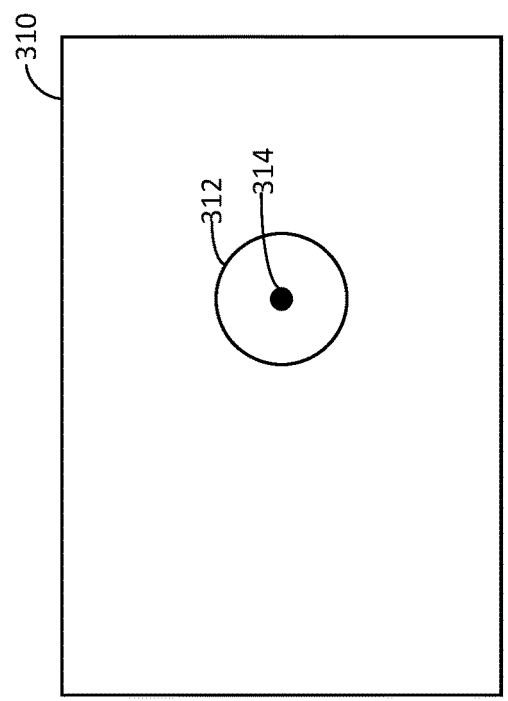
FIG. 3A is an example image capturing a targeted object exposed to a tracking beam at a single location, in accordance with one embodiment.

FIG. 3A is an example image 310 capturing a targeted object 312 exposed to a tracking beam 314 at a single location, in accordance with one embodiment. The image 310 may be captured by an image sensor (e.g., image sensor 110, image sensor 240), and image data corresponding to the image 310 may be provided to a vision processor (e.g., vision processor 122, 290) to be analyzed. The vision processor detects the targeted object 312 in the image 310 using an image processing algorithm and localizes the targeted object 312 using a localization algorithm. Based on the location of pixels corresponding to the identified object 312 within the image 310, the vision processor predicts future locations of the targeted object 312. The vision processor may be in communication with a tracking beam control processor (e.g., tracking beam control processor 180, 295), and the vision processor and/or the tracking beam control processor use the predicted future locations determined from the image 310 to generate control signals (e.g., control signals 160, scanner control signal 270, actuator control signal 272 control signal 128) to direct a tracking beam 314 onto the targeted object 312. In the example image 310, the tracking beam 314 is directed to be at a center of the targeted object 312, but the tracking beam 314 may be directed elsewhere on the targeted object 312. As the targeted object 312 moves along its trajectory, the image sensor captures new images 310, and the processor generates updated control signals such that the tracking beam 314 may continue to be directed accurately onto the targeted object 312.

FIG. 3B is an example image 320 capturing a targeted object 324 exposed to tracking beams 322 at multiple locations, in accordance with an embodiment. In some embodiments, multiple tracking beams 322 may be directed onto the targeted object 324 such that the processor may determine distance to different locations on the targeted object 324. Using multiple tracking beams 322 may allow the processor to determine the contours of the targeted object 324 and the orientation of the targeted object 324 as the targeted object 324 moves.

Figure 3C:
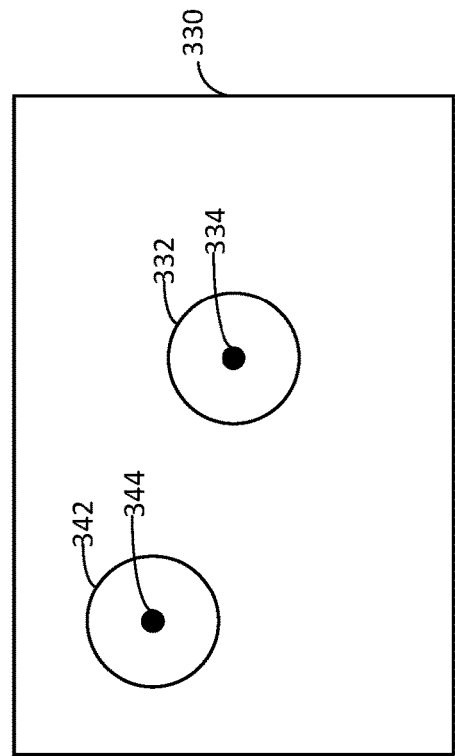
FIG. 3C is an example image capturing a plurality of targeted objects each exposed to a different tracking beam, in accordance with one embodiment

FIG. 3C is an example image 330 capturing a plurality of targeted objects each exposed to a different tracking beam, in accordance with an embodiment. The image 330 may capture a first object 332 and a second object 342. The processor may detect the first object 332 and the second object 342 and predict future locations of both the first object 332 and the second object 342 based on pixels corresponding to the respective object. The first object 332 may be tracked using a first tracking beam 334 and the second object 342 may be tracked using a second tracking beam 344. Both tracking beams 334, 344 may be emitted from the same range finder or the same beam emitter. Alternatively, tracking beams 334, 344 may be emitted from different range finders or beam emitters. The processor updates control signals for each of the first tracking beam 334 and the second tracking beam 344 as the first object 332 and the second object 342 move.

Figure 4A:
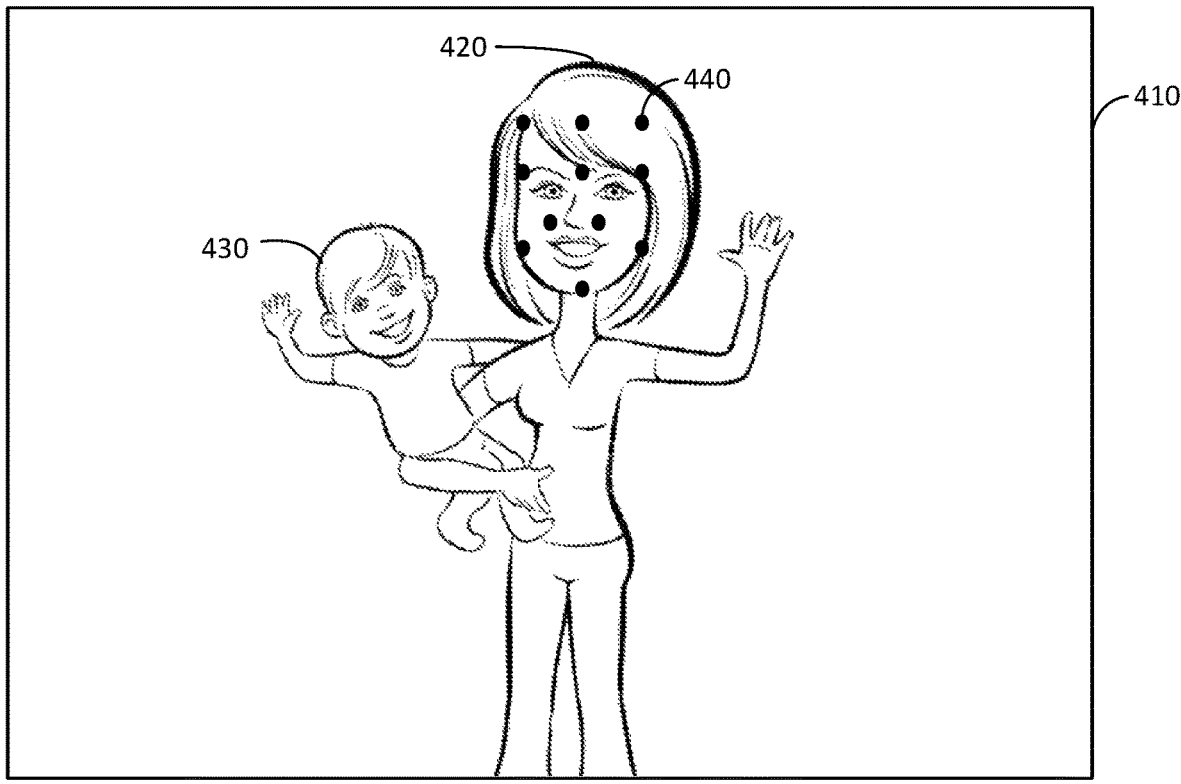
FIG. 4A is an example image captured by a wide field of view camera, in accordance with one embodiment.

FIG. 4A is an example image 410 captured by a wide field of view camera, in accordance with one embodiment. The vision first LIDAR systems discussed with respect to FIGS. 1A-1C and 2A-2D may be used to track the targeted objects or may be integrated with a mobile system such as a mobile robot moves within an environment such as a building and capture images of its environment or an autonomous vehicle. As discussed above, a vision first LIDAR system may include a wide field of view camera (e.g., image sensor 240). The image 410 may capture stationary subjects such as buildings, signs, traffic light, walls, furniture, equipment, and objects, and slow-moving subjects such as vehicles, people, and animals.

In some embodiments, the image 410 may include a first person 420 and a second person 430. The image 410 may be provided to a vision processor (e.g., vision processor 122, 290) to be analyzed. The vision processor performs image processing to detect objects in the image 410 and determine a targeted object in the image 410, such as a face of the first person 420 as shown in FIG. 4A. After determining the targeted object, the vision processor generates control signals (e.g., control signals 160, scanner control signal 270, actuator control signal 272, beam emitter control signal 280) to direct one or more tracking beams 440 onto the targeted object to determine a distance to the targeted object. In the example shown in FIG. 4A, the plurality of tracking beams 440 are directed onto different features of the face. In one application, the vision processor may use the plurality of tracking beams 440 for facial recognition of the first person 420 by determining distances to different locations of the face. The vision processor may target a plurality of targeted objects at a same time.

Figure 4B:
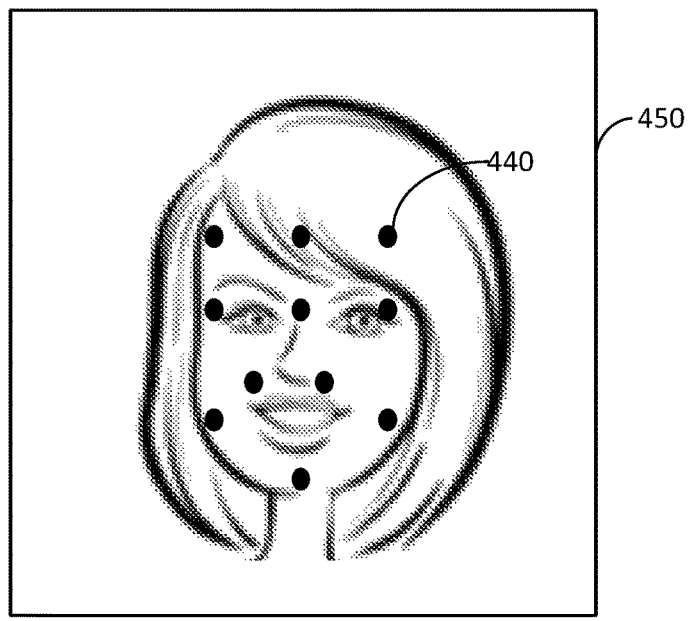
FIG. 4B is an example image captured by a narrow field of view camera, in accordance with one embodiment.

FIG. 4B is an example image captured by a narrow field of view camera, in accordance with one embodiment. In some embodiments, a vision first LIDAR system may capture a wide FOV image (e.g., image 410) to determine a targeted object and then capture a narrow FOV image (e.g., image 450) using a narrow FOV camera (e.g., first camera 110) to capture a higher resolution image of a portion of the wide FOV image. In the example shown in FIG. 4B, the image 450 is a close-up image of the face of the first person 420. Because the image 450 has a higher resolution, it includes details of the face that cannot be captured in the image 410. The image 450 may be provided to the vision processor, and the vision processor may further perform image processing to generate control signals for directing the one or more tracking beams 440 onto the face. The vision processor may use the image 410 for initial detection of the targeted object and use the image 450 to fine-tune controlling the one or more tracking beams 440.

Figure 5:
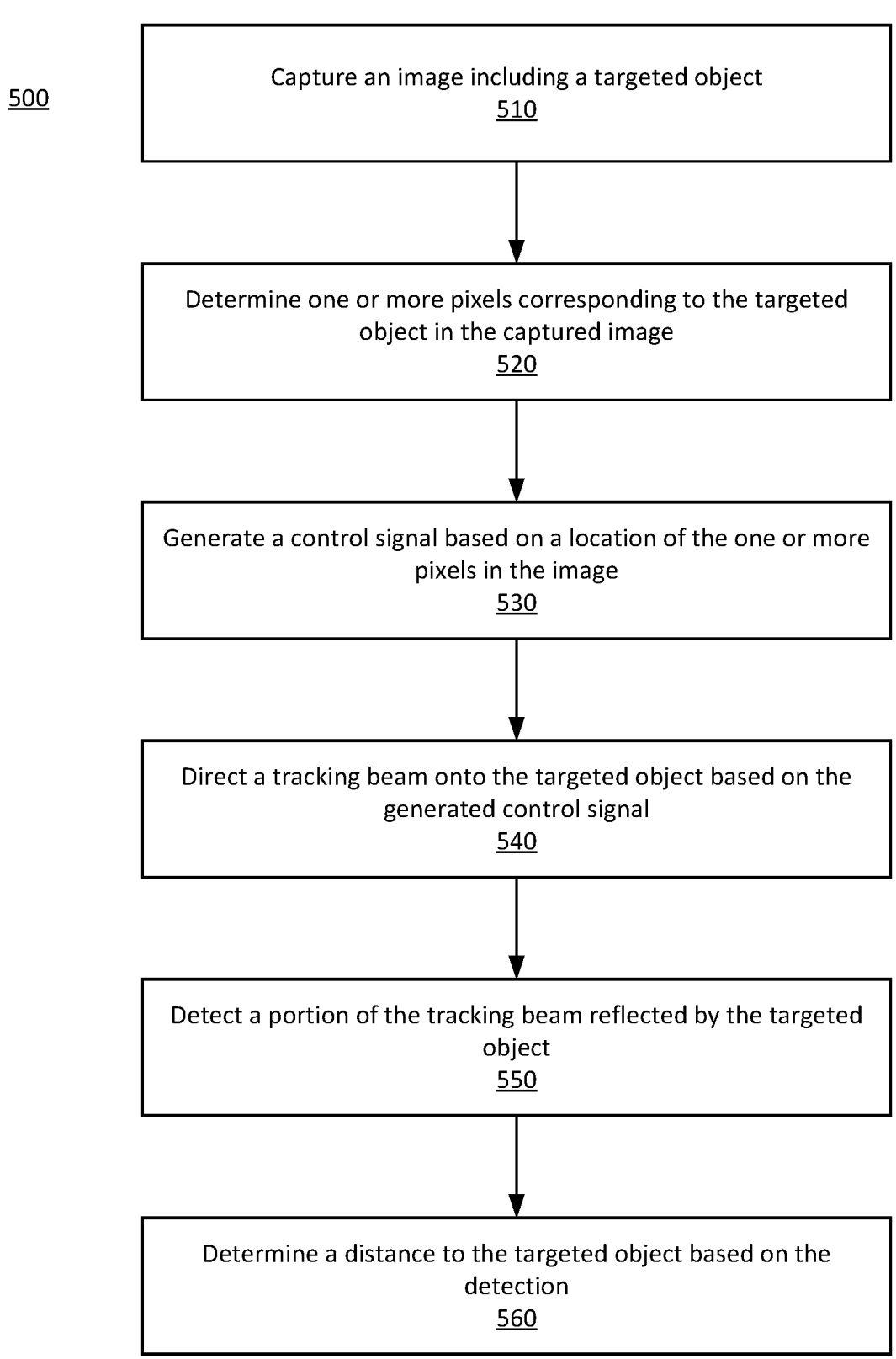
FIG. 5 is a flowchart depicting a process of operating a vision first LIDAR system, in accordance with one embodiment.

FIG. 5 is a flowchart 500 depicting a process of operating a vision first LIDAR system, in accordance with an embodiment. A vision first LIDAR system captures 510 an image including a targeted object. The vision first LIDAR system may include one or more image sensor with different FOVs.

The vision first LIDAR system determines 520 one or more pixels corresponding to the targeted object in the captured image. Image processing may be performed on the captured image to detect and localize the targeted object in the captured image. The vision first LIDAR system may predict a future location of the targeted object based on the one or more pixel locations.

The vision first LIDAR system generates 530 a control signal based on a location of the one or more pixels in the image. Based on the control signal, the vision first LIDAR system directs 540 a tracking beam onto the targeted object. The tracking beam may be directed using a beam scanner.

After directing the tracking beam onto the targeted object, the vision first LIDAR system detects 550 a portion of the tracking beam reflected by the targeted object. Based on the detection of the reflected tracking beam, the vision first LIDAR system determines 560 a distance to the targeted object. The distance may be determined based on an elapsed time between a time at which the tracking beam is emitted and a time at which the reflected tracking beam is detected.

Because the targeted object is moving, the vision first LIDAR system repeats predicting the location of the targeted object in the environment and updating the control signal for directing the tracking beam to continue making accurate distance measurements to the targeted object.

Figure 6:
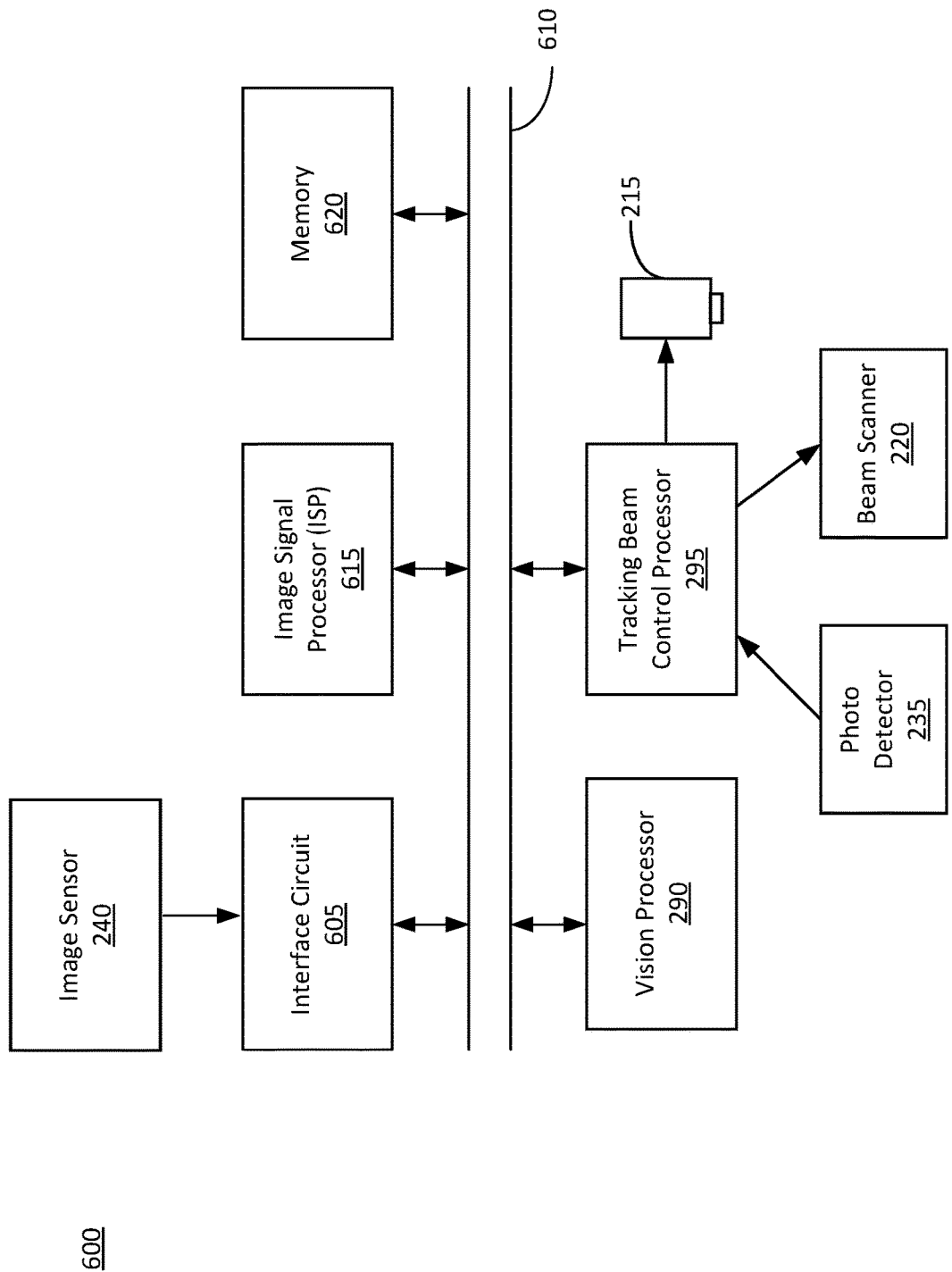
FIG. 6 is a block diagram illustrating a computing system for operating a vision first LIDAR system, in accordance with one embodiment.

FIG. 6 is a block diagram illustrating a computing system 600 for operating a vision first LIDAR system, in accordance with an embodiment. For simplicity, the computing system 600 is described in conjunction with embodiments described with respect to FIGS. 2A-2C. However, the computing system 600 may be used to operate vision first LIDAR system in accordance with alternate embodiments such as those described with respect to FIGS. 1A-1C. The computing system 600 includes the image sensor 240, an interface circuit 605, a bus 610, an image signal processor (ISP) 615, a memory 620, a processor vision processor 290, a tracking beam control processor 295, a beam emitter 215, a beam scanner 220, and a photo detector 235. Other embodiments of the computing system 600 may have different architecture.

The image sensor 240 is hardware or a combination of hardware and software that captures an image and provides the image to the interface circuit 605 that connects the image sensor 240 to the bus 610. The bus 610 may be used to facilitate communication among the ISP 615, the memory 620, the vision processor 290, and the tracking beam control processor 295, for example, according to inter-integrated circuit (I2C) protocol or serial peripheral protocol (SPI). In some embodiments, the images from the image sensor 240 may be provided to the ISP 615 without the bus 610.

The ISP 615 performs image signal processing on the images from the interface circuit 605. The ISP 615 may identify a targeted object in the images using, for example, one or more of edge detection, deep learning, Hough transform, Kalman filter, spatial filter, temporal filter, and other vision recognition methods to localize the targeted object. In other embodiments, at least some of these processes may be performed at the vision processor 290 instead of the ISP 615. The ISP 615 may perform different image signal processing methods depending on the type of object being identified. The ISP 615 may also perform cropping, scaling, generating motion vectors, autofocus control or image enhancement to improve accuracy of the targeted object detection and compensate for blurriness, distortion, and/or incorrect position. After identifying the targeted object in an image, the ISP 615 determines pixel locations corresponding to the identified object in the image. The ISP 615 may be connected to the memory 620 that stores data until read by the ISP 615. The memory 620 may be a dynamic random-access memory (DRAM). In some embodiments, low level computing such as applying pre-processing filters to the images may be performed by the image sensor 240 and/or the interface circuit 605.

The vision processor 290 receives the pixel locations corresponding to the identified object from the ISP 615. The vision processor 290 maps the pixel locations to coordinates in the real-world environment and provide information of interest (e.g., identification of the targeted object and pixel locations covering the targeted object) to the tracking beam control processor 295. The vision processor 290 may generate control signals sent to the actuator 265 to operate the optics assembly 210.

The tracking beam control processor 295 is connected to the beam emitter 215, the beam scanner 220, and the photo detector 235. The tracking beam control processor 295 generates the control signals to instruct the beam emitter 215 to emit a tracking beam and move light guiding elements in the beam scanner 220 in position to direct the tracking beam onto the targeted object. The photo detector 235 detects the emitted tracking beam and provides a detection signal to the tracking beam control processor 295 that determines distance information and generates the control signals for the beam scanner 220 and the beam emitter 215.

The computing system 600 may output the image captured by the image sensor 240 and the distance information determined using the distance sensor to a user. The vision processor 290 may further analyze the image and the distance information to generate information relevant to the application in which the vision first LIDAR device is used. For example, in the context of baseball, the vision processor 290 may analyze movement of the ball during its flight after a batter hits the ball or the trajectory of the baseball bat as the batter swings the baseball bat and provide the analysis results to a user.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

What is claimed is:

1. A ranging system comprising:
a first image sensor configured to capture an image including a targeted object at a first time;
a distance sensor configured to detect distances to a plurality of locations on the targeted object by emitting a plurality of tracking beams and detecting portions of the tracking beams reflected from the targeted object;
a beam scanner configured to receive the tracking beams and direct the tracking beams onto the plurality of locations on the target object but not onto objects other than the targeted object according to a control signal during a frame time of the first image sensor, the beam scanner further configured to receive light reflected from the targeted object and direct the received light to the first image sensor; and
a processor coupled to the image sensor, the distance sensor and the beam scanner, the processor configured to:
determine one or more pixels corresponding to the targeted object in the captured image;
generate the control signal for controlling the tracking beams by predicting a location of the targeted object at a second time subsequent to the first time according to a location of the one or more pixels in the image; and
provide the control signal to the beam scanner to direct the tracking beams onto the plurality of locations on the targeted object at the second time.

2. The ranging system of claim 1, further comprising an optics assembly in a path of light between the first image sensor and the targeted object, the optics assembly configured to adjust a field of view of the first image sensor to capture the image including the targeted object.

3. The ranging system of claim 2, wherein the optical assembly is further configured to:
direct the emitted tracking beams to the targeted object, and
direct the portions of the tracking beams reflected from the targeted object to the distance sensor.

4. The ranging system of claim 1, further comprising a beam combiner disposed between the distance sensor and the beam scanner, the beam combiner configured to transmit the portions of the tracking beams to the distance sensor and reflect light representing the targeted object to the first image sensor.

5. The ranging system of claim 1, wherein the beam scanner is a galvanometer mirror or a microelectromechanical system (MEMS) mirror.

6. The ranging system of claim 1, wherein a beam splitter is disposed between the first image sensor and a second image sensor, the first image sensor is configured to capture a first field of view that is narrower than a second field of view of the second image sensor.

7. The ranging of claim 1, further comprising a first beam splitter and a second beam splitter that are configured to transmit the portions of the tracking beams reflected from the targeted object through the first beam splitter and reflect by the second beam splitter to the distance sensor.

8. The ranging system of claim 1, wherein the distance sensor is configured to emit an additional tracking beam for tracking another targeted object different from the targeted object.

9. The ranging system of claim 1, wherein the distance sensor is configured to detect the distances to the targeted object based on elapsed times between times at which the tracking beams are emitted onto the plurality of locations on the target object and times at which the portions of the tracking beams are detected.

10. The ranging system of claim 1, wherein the processor is further configured to determine at least one of a contour of the targeted object or an orientation of the targeted object based on the distances to the plurality of locations on the targeted object.

11. The ranging system of claim 1, wherein the processor is further configured to perform facial recognition based on the distances to the plurality of locations on the targeted object.

12. A method comprising:
receiving light reflected from a target object by a beam scanner;
directing the received light by the beam scanner to an image sensor;
capturing an image including a targeted object at a first time by the image sensor using the directed light;
determining one or more pixels corresponding to the targeted object in the captured image;
generating a control signal for controlling a plurality of tracking beams by predicting a location of the targeted object at a second time subsequent to the first time according to a location of the one or more pixels in the image;
directing the plurality of tracking beams onto a plurality of locations on the targeted object but not onto objects other than the targeted objects during a frame time of the image sensor by controlling the beam scanner based on the generated control signal;
detecting portions of the tracking beams reflected from the plurality of locations of the targeted object; and determining distances to the plurality of locations on the targeted object at the second time based on the detection.

13. The method of claim 12, wherein the distances are determined based on elapsed times between a time at which the tracking beams are emitted onto the plurality of locations on the target object and times at which the portions of the tracking beam are detected.

14. The method of claim 12, wherein determining the one or more pixels corresponding to the targeted object in the captured image comprises performing image processing on the image.

15. The method of claim 12, further comprising determining at least one of a contour of the targeted object or an orientation of the targeted object based on the distances to the plurality of locations on the targeted object.

16. The method of claim 12, further comprising performing facial recognition based on the distances to the plurality of locations on the targeted object.

17. The method of claim 12, further comprising:
determining another one or more pixels corresponding to another targeted object in the captured image;
generating another control signal based on the location of the other one or more pixels; and
directing an additional tracking beam onto the other targeted object.

18. The method of claim 12, wherein directing the tracking beam onto the targeted object comprises:
providing the control signal to a beam scanner, the control signal configured to adjust an orientation of the beam scanner to reflect the tracking beam onto the targeted object.

19. A non-transitory computer-readable medium storing instructions, that when executed by one or more processors cause the processors to:
receive light reflected from a target object by a beam scanner;
direct the received light by the beam scanner to an image sensor;
capture an image including a targeted object at a first time by the image sensor using the directed light;
determine one or more pixels corresponding to the targeted object in the captured image;
generate a control signal for controlling a plurality of tracking beams by predicting a location of the targeted object at a second time subsequent to the first time according to a location of the one or more pixels in the image;
direct the plurality of tracking beams onto a plurality of locations on the targeted object but not onto objects other than the targeted objects during a frame time of the image sensor by controlling the beam scanner based on the generated control signal;
detect portions of the tracking beams reflected by the targeted object; and
determine distances to the plurality of locations on the targeted object at the second time based on the detection.

20. The non-transitory computer-readable medium storing instructions of claim 19, wherein the distances are determined based on elapsed times between times at which the tracking beams are emitted and times at which the portions of the tracking beams are detected.

21. The non-transitory computer-readable medium storing instructions of claim 19, wherein determining one or more pixels corresponding to the targeted object in the captured image comprises performing image processing on the image.

22. The non-transitory computer-readable medium storing instructions of claim 19, wherein the instructions further cause the one or more processors to determine at least one of a contour of the targeted object or an orientation of the targeted object based on the distances to the plurality of locations on the targeted object.

23. The non-transitory computer-readable medium storing instructions of claim 19, wherein the instructions further cause the one or more processors to perform facial recognition based on the distances to the plurality of locations on the targeted object.

* * * * *